C. G. HUTCHINSON.
Bottle-Stopper.

No. 8,755. Reissued June 17, 1879.

Attest:
S. S. Schoff
Charles H. Schoff

INVENTOR:
Charles G. Hutchinson
By F. F. Warner, his
Attorney.

THE NORRIS PETERS CO., PHOTO-LITHO., WASHINGTON, D. C.

UNITED STATES PATENT OFFICE.

CHARLES G. HUTCHINSON, OF CHICAGO, ILLINOIS.

IMPROVEMENT IN BOTTLE-STOPPERS.

Specification forming part of Letters Patent No. 213,992, dated April 8, 1879; Reissue No. 8,755, dated June 17, 1879; application filed April 28, 1879.

*To all whom it may concern:*

Be it known that I, CHARLES G. HUTCHINSON, of Chicago, in the county of Cook and State of Illinois, have invented certain new and useful Improvements in Bottle-Stoppers, of which the following, in connection with the accompanying drawings, is a specification.

Figure 2:
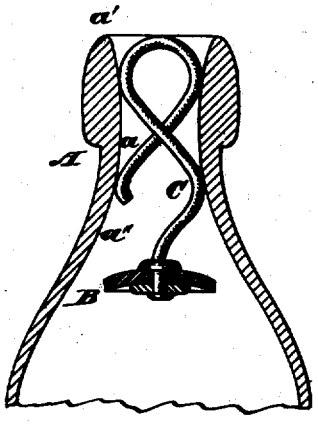
Figure 1:
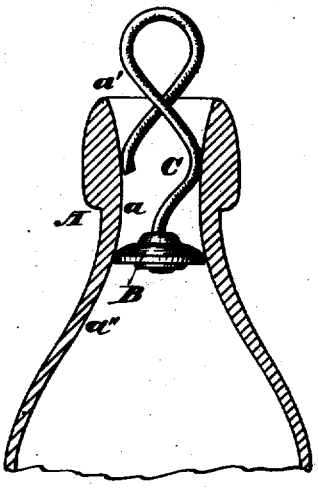

Figure 1 is a vertical central section of the upper part or neck of a bottle provided with my improved stopper, showing the latter in its highest position, or when the bottle is closed; Fig. 2, a like representation, showing the position of the stopper when the bottle is open.

In the drawings, A represents the neck or upper portion of a bottle. The neck is contracted, as shown at *a*, between its upper or outer end, *a'*, and its lower end or portion, *a''*, which merges into the body of the bottle.

B is the stopper, which may consist, as heretofore, of a disk of rubber. C is a laterally-yielding spring, to which the stopper is attached. This spring extends above the stopper and enters the contracted portion of the neck of the bottle, as shown.

In order that the stopper B may be suspended below or away from the neck of the bottle, so that the neck will be open, I extend the spring C upward, but make this upper part sufficiently large to prevent it from falling down through the neck accidentally, and not so large as to prevent the lower part of the spring from being pushed through, and far enough below the narrowest part of the neck to fully open the latter, as shown in Fig. 2. To admit of the stopper or plug B being held up to or into the contracted part of the neck by means of the spring, so as to close the neck, I make the lower part of the spring sufficiently yielding to pass through or into the contracted part of the neck, and to press upon the same outwardly, thus holding the stopper in its closed position, as shown in Fig. 1.

It will be perceived that, the spring being laterally yielding, and some of its parts being at all times in contact with the contracted neck, the stopper will be held by it either in such a position as to close the neck or in such a position as to keep it open, as may be desirable or necessary, and that the stopper when open will be held from contact with the bottle. In other words, the friction or pressure of the spring against the interior wall of the neck holds the stopper either in a position to close or open the bottle, according as to whether the spring be drawn up or pushed down.

The chief novel feature of my invention, so far as I am aware, consists of a laterally or outwardly yielding spring applied to the stopper or plug proper, and adapted to extend up through and press against the interior of the neck of the bottle, so that the stopper will thereby be suspended in a position to either close or open the neck as the spring is moved either up or down, and be held in either its closed or open position by the action of the spring. I do not, therefore, here intend to be restricted to the precise form of spring herein shown; neither do I regard a neck made contracted between its upper end and its junction with the body of the bottle absolutely essential, for it is obvious that a laterally-yielding spring properly fitted into a straight neck would suspend the plug or stopper adjustably by the mere lateral pressure of the spring against the interior of the neck.

A simple and inexpensive way of constructing a spring for the purposes set forth, and uniting in it all the advantages now recited, is to make it of flexible wire, bending the wire so that the spring will approximate the figure 8 in form, as shown, leaving one end free, and attaching the other to the stopper. A small hook may be employed to draw the stopper up into the neck, the top of the spring serving as a loop to receive the hook. The stopper, however, may be drawn up by grasping the spring with the fingers; but it is not essential that the spring should intersect or cross itself, or that it should, except when used in a contracted neck, approximate the figure 8 in form.

Having thus described my invention, what I claim as new, and desire to secure by Letters Patent, is—

1. The combination, substantially as described, with the neck of a bottle, of a bottle-stopper arranged in the body of the bottle, and provided with a laterally-yielding spring connected thereto and extending upward therefrom and forming a part thereof, when the said spring and stopper are adjustable together vertically in the neck, and the spring is adapted, substantially as described, to hold the stopper alternately in its open and closed positions by pressing outwardly against the interior of the neck, according to the adjustment vertically of the spring in the neck, for the purposes set forth.

2. A bottle-stopper consisting of the plug B, provided on its upper face with the continuous flexible wire C, rigidly attached thereto at one end, and bent to approximate the figure 8 in form, the other end of the said wire being bent back to a point near the end attached to the plug, and the end so bent back being left free or loose, in combination with a bottle having a neck somewhat narrower interiorly than the said bent part or extension of the stopper, substantially as shown and described, and for the purposes set forth.

CHARLES G. HUTCHINSON.

In presence of—
F. F. WARNER,
H. C. BALLARD.